Patented Feb. 26, 1935

1,992,232

UNITED STATES PATENT OFFICE 1,992,232

SHOCK ABSORBER

John M. Nalle, Fairfield, Conn., assignor to American Chain Company, Inc., a corporation of New York Application April 5, 1929, Serial No. 352,634

21 Claims. (Cl. 188—88)

My invention relates to improvements in shock absorbers for spring mounted vehicles, and is particularly, although not exclusively, adapted to use on motor vehicles.

Heretofore, in the design of shock absorbers for motor vehicles, efforts have been directed to overcoming the discomforts of travel over humps and hollows of considerable magnitude, but little attention has been paid to the effect of lesser unevennesses of the road. A car driven over an average city street at average speed is constantly "see-sawed", by the slight elevations and depressions that are traversed. As the front of the vehicle rides over an obstruction or drops into a depression, the vehicle body oscillates about its instantaneous center of oscillation and, by the time the rear wheels reach the unevenness in the road, the rear springs are already partly compressed or expanded, as the case may be, so that there is an increased throw of the rear end of the vehicle. This see-sawing action is particularly marked when traveling at moderate speeds and reaches its maximum when the speed of a car of given wheel base bears a certain relation to the natural period of oscillation of the car springs. The see-sawing movements of a car may be small but because of their frequency probably contribute, in the aggregate, as much discomfort as the more marked but comparatively less frequent big bumps encountered.

This see-sawing action may be reduced by snubbing the small movements of the springs, or, in other words, by resisting spring movements at the so-called "free center". I have found that this is best done by damping the spring both on the up stroke and the down stroke. The degree of snubbing, however, should be but a fractional part of that required for large bumps. Snubbing required to reduce see-sawing, when applied on both the compression and the expansion strokes of the springs, does not stiffen the springs to an extent noticeable to the occupants of the vehicle. In order to reduce the see-sawing action of the vehicle to the same extent, by snubbing in one direction only, it would be necessary to employ substantially double the magnitude of snubbing required if applied in both directions. If this double amount of snubbing is applied on the compression stroke of the spring it will have a perceptible spring stiffening effect. If, on the other hand, it is applied on the expansion stroke of the spring, it will tend to "pump" the body down with the spring. By "pumping" I mean the pulling down of the vehicle body by a series of bumps when the expansion stroke is so protracted that the spring cannot fully recover from one compression before it is recompressed by the next bump.

When larger bumps are encountered, proportionately more snubbing is needed to keep the vertical acceleration of the vehicle body or frame from exceeding certain limits. I find it desirable, therefore, to employ a certain amount of resistance to compression of the spring on its initial movement away from normal, increasing the snubbing after the spring has moved through a small range, and finally sharply increasing the snubbing as the spring movement nears the limit of its range, so as to prevent the axle from sharply striking the frame of the vehicle. The same is true of the expansion stroke, except that instead of preventing the frame from striking the axle at the extreme movements of the spring, a sharp increase of snubbing serves to prevent such distortion of the spring as may cause it to break.

It is, therefore, an object of my invention to provide a shock absorber which will control small and large oscillations of a spring on movements away from normal as well as toward normal.

Another object of my invention is to provide a shock absorber which will reduce the see-sawing of a vehicle body when the vehicle passes at moderate speed over comparatively small unevennesses in the road.

Another object of my invention is to provide a shock absorber which will permit the use of softer springs, that is, springs that are more easily flexed than those now commonly used on any given car.

Another object of my invention is to provide a shock absorber which will snub a spring at the end of its compression stroke, to prevent the axle of the vehicle from sharply striking the vehicle frame.

Another object of my invention is to provide a shock absorber which will prevent excessive flexure of a spring in either direction away from normal.

In my copending application, Serial No. 333,758, filed January 21, 1929, I described a hydraulic shock absorber of the type having a double ended piston or equivalent member, operating in a cylinder or casing and thus dividing the same into a pair of opposed, oil-filled working-chambers which were alternately expanded and contracted by reciprocation of the piston, resistance to movement of the piston being offered by throttling the escape of oil from the contracting chamber. Two valve controls were provided, one dependent upon the instant position of the piston and the other upon the pressure developed in the contracting chamber. The oil escaping from the contracting chamber, under position-throttle control, passed into a central make-up chamber, while the expanding chamber sucked in oil from the central chamber through a make-up check-valve. Thus, the expanding chamber was not positively filled with oil and there was the danger of a deficiency of oil therein. Obviously, such deficiency of oil would affect the snubbing of the vehicle spring. Also because the oil was discharged into and withdrawn from a central chamber in which a supply of oil was maintained at atmospheric pressure, there was a tendency to churn and emulsify the oil in the central chamber. This emulsified oil, on entering the working chambers, would seriously affect the resistance offered to the oscillations of the vehicle spring.

My present invention has for an object to overcome these difficulties by discharging the oil from one working chamber directly into the other working chamber, without passing it through an intermediate supply chamber, so that the contracting chamber is positively filled with oil and is kept filled, regardless of the rapidity of movement of the piston. By this arrangement the oil is kept free from emulsification.

My present invention contemplates the use of a make-up chamber with check-valves opening into the two working chambers, but the function of these valves is merely to make-up any deficiency in the working chambers due to leakage past the piston.

Another object of my invention is to provide, in series with the position-throttling means, a spring-controlled valve by which the discharge of oil from one working chamber into the other is controlled not only by the travel of the piston, but also by the pressure developed in the contracting working chamber.

A further object of my present invention is to provide a shock absorber embodying the features described above and having, in addition thereto, a duct running from one working chamber to the other and controlled by a balanced valve which will open in the direction of the expanding chamber when the differential pressure in the working chambers reaches a predetermined amount, this duct serving to pass oil from one working chamber to the other, not only when the position-controlled throttle valve has caused the development of a predetermined degree of pressure in the contracting chamber, but also after said throttle has been closed off entirely.

Another object of the invention is to provide a hydraulic shock absorber of the type described above with a working chamber having a resiliently expansible wall adapted to modify the pressures developed in said chamber.

Other objects of my invention will, in some cases, be readily apparent and in others will be pointed out specifically in the following description of a preferred embodiment of my invention, while the novelty and scope of the invention will thereafter be pointed out in the claims.

In the accompanying drawings.

The shock absorber comprises a main body 10 formed with a hollow cylinder portion 11 which is closed at each end by means of caps 12 screwed thereon. Above this cylinder the body is formed with a chamber 13 which communicates with the bore of the cylinder and is closed at the top by means of a lid 14. The chamber 13 and the cylinder 11 are adapted to receive a quantity of oil which is fed therein through a port 15, and the latter is normally closed by a plug 16 screwed into the port 15.

Fitted within the cylinder 11 is a double ended piston 20 which divides the cylinder into two working chambers 11a and 11b respectively. The piston 20 is flattened at the top, intermediate its ends, to form a recess 21 communicating with the chamber 13, and a similar recess 22 is formed in the under side of the piston. Extending vertically through the piston from the recess 21 to the recess 22, is a slot 23 of rectangular form. This slot is adapted to receive a shoe 24 formed with an arcuate socket 26 running transversely therethrough and of somewhat more than 180° in extent. This socket is adapted to receive a cylindrical knob 27, formed on the end of a crank arm 28. The crank arm is keyed to a shaft 29 which is journaled in bearings 30 and 31 in the body 10 and extends through the chamber 13, in a plane transverse to the cylinder 11.

Figure 4:
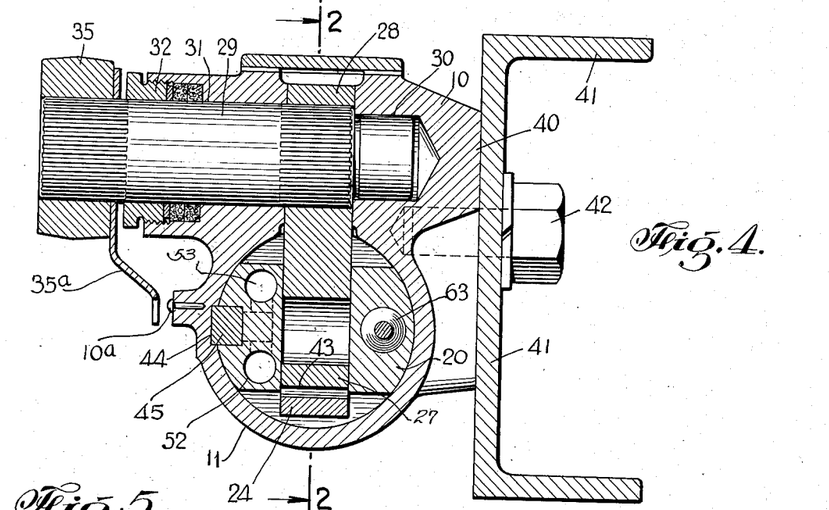
Fig. 4 is a view in transverse section taken on the line 4—4 of Fig. 2.
Figure 5:
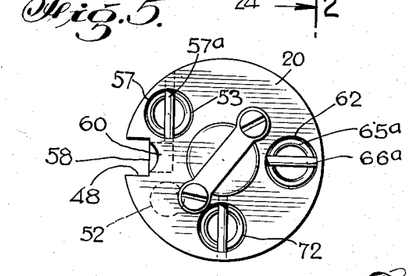
Fig. 5 is an end view of a piston used in my shock absorber, looking in the direction of the arrows 5—5 of Fig. 2.
Figure 6:
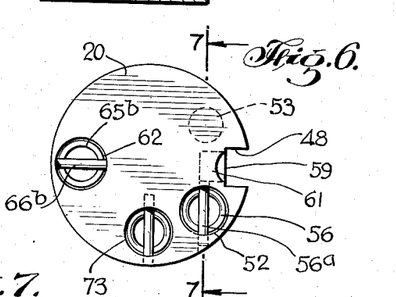
Fig. 6 is a similar view looking in the direction of the arrows 6—6 of Fig. 2.

As shown in Fig. 4, the shaft 29 projects from the side of the casing 10, and a stuffing box 32 of suitable form is provided to prevent leakage of oil through the bearing 31 and out of the body 10. The projecting end of the shaft 29 has keyed thereon a crank arm 35 (Fig. 1), the outer end of which is connected by a rod 36 to a stud 37, or other suitable device secured to the axle 38 of the vehicle. The axle, of course, is connected to one of the main springs 39 of the vehicle. The body 10 of the shock absorber is provided with pads 40 adapted to be seated against a fixed part 41 of the vehicle frame, being held thereagainst by means of screws 42, as shown in Fig. 4. Thus, as the spring 39 is flexed, the piston 20 will be reciprocated in the cylinder 11 by reason of the connections above described. In other words, movement of the spring will cause the shaft 29 to rotate, oscillating the crank 28 and thus causing movement of the piston 20.

As the crank arm 28 oscillates, the shoe 24 will move up and down within the slot 23. It will be noted that, because the socket 26 has an angular extent of more than 180°, it will cling to the knob 27 and will rise and fall with the oscillation of said knob. In order to prevent trapping or pumping of oil by the rise and fall of the shoe the piston is formed with ducts 21a and 21b connecting the recesses 21 and 22. The lower end of the knob 27 is flattened, as indicated at 43, leaving a slight space for oil, which serves to lubricate the bearing of the knob in the socket 26. In assembling the parts, the shoe 24 is applied to the knob by sliding it transversely thereon, after which the crank 28 with the shoe connected thereto may be inserted in the slot 23.

Figures 1, 2, 2A:
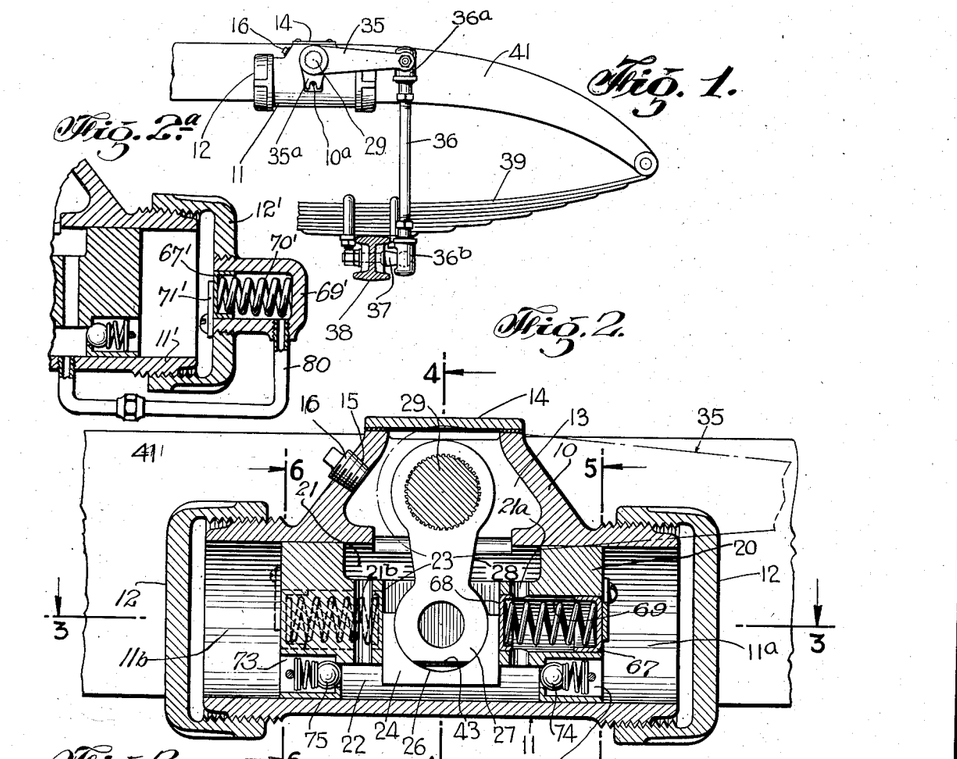
Figure 1 is a side view showing my improved hydraulic shock absorber applied to a portion of a vehicle.
Fig. 2 is a view of the shock absorber in longitudinal section, the section being taken on the line 2—2 of Fig. 4.
Fig. 2a is a fragmental view in longitudinal section showing a modification of the shock absorber.

As shown in Figs. 1 and 4 the shaft 29 has an indicator arm 35a secured thereon which, by its position with respect to a pin 10a on the casing 10, indicates whether the plunger 20 is centered in the cylinder. The rod 36 has socket members 36a and 36b at opposite ends thereof to which it is connected by right and left hand threads so that by turning the rod in said socket members the arm 35 may be adjusted with respect to the axle until, with the vehicle under normal load, the piston 20 will be centered in the cylinder 11.

Figure 3:
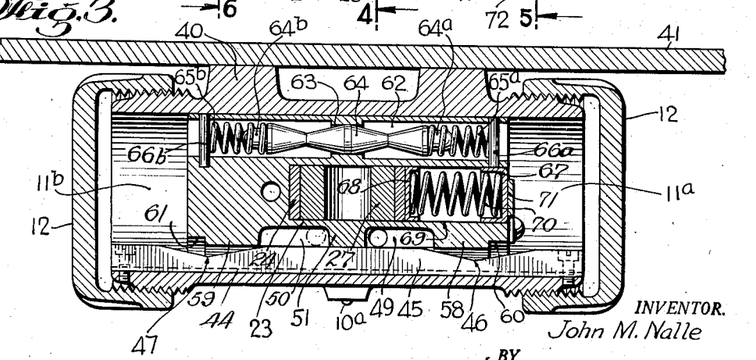
Fig. 3 is a view in longitudinal section taken on the line 3—3 of Fig. 2.
Figure 7:
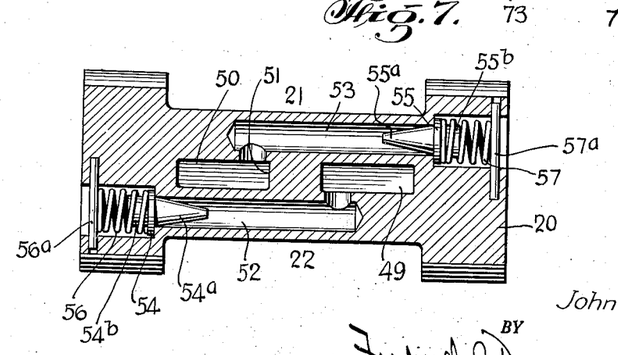
Fig. 7 is a view of the piston in longitudinal section, the section being taken on the line 7—7 of Fig. 6.

As shown in Figs. 3 and 4, the cylinder 11 is formed with a seat 44 at one side to receive a throttle bar 45. The latter extends practically the full length of the cylinder and is secured to the seat 44 by means of screws, as shown. The outer face of the throttle bar is formed with a pair of shallow V-shaped notches 46 and 47 respectively. The piston 20 is formed with a slot 48 to receive the throttle bar. The slot 48 is deepened at two points to form recesses 49 and 50 which are separated by a central wall 51. The recess 49, as best shown in Fig. 7, communicates with a duct 52 running to the left hand end of the piston, while the recess 50 is connected by a similar duct 53 running to the right hand end of the piston. The outer ends of these ducts are enlarged to form seats for a pair of valves 54 and 55 respectively. The valves are formed with flange portions adapted to bear upon the valve seats and with conically tapered body portions 54a and 55a respectively, which extend into the ducts. Springs 56 and 57 press the valves 54 and 55 respectively against their seats and the valves are preferably provided with stems 54b and 55b respectively, which fit into the springs and are centered thereby. The outer ends of the springs are anchored to the piston by means of pins 56a and 57a respectively. The recesses 49 and 50 are separated from the ends of the piston by walls 58 and 59 respectively, which are preferably reduced in thickness by notches 60 and 61 respectively, cut in the ends of the piston.

On the side opposite the slot 48, the piston is formed with a duct 62 extending from end to end of the piston. This duct is centrally contracted to form an annular valve seat 63 in which a valve 64 is fitted to slide. A valve 64 is normally held in central position by opposed compression springs 65a and 65b. These springs fit upon stems 64a and 64b projecting from opposite ends of the valve 64. The springs bear at one end against the body of the valve and are secured to the piston at their opposite ends by means of pins 66a and 66b respectively. The body of the valve 64 is conically tapered to a smaller diameter at each side of its central transverse plane, so as to graduate the size of the opening formed as the valve moves off its seat in either direction. The duct 62 provides communication between chambers 11a and 11b and the valve 64 will open to permit exchange of fluid between these chambers when the pressure in either one of them overbalances the pressure in the other sufficiently as to move the valve clear of its seat 63.

I also employ a cushion device at one end of the piston which comprises a spring pressed cushion plunger 67. This plunger and an opposed plunger 68 are fitted to slide in a bore 69 formed in the piston. The bore extends from the right hand face of the piston, as shown in Figs. 2 and 3, to the slot 23 in which slides the shoe 24. The plungers 67 and 68 are preferably cup-shaped, with their concave faces directed inwardly to receive a compression spring 70. This spring presses the cushion plunger 67 against a strap 71 so that it lies flush with the end of the piston. At the same time the plunger 68 is pressed against the shoe 24 and serves to take up any slack between said shoe and the slot 23, thus overcoming any tendency for the shoe to knock as it reciprocates in the piston. It will be observed from (Fig. 2) that the bore 69 is traversed by the duct 21a so that the oil in the supply chamber may enter said bore and lubricate the plungers 67 and 68, and at the same time there will be no danger of trapping oil in the bore. The purpose of the cushion plunger will be explained hereinafter.

The oil in the chamber 13 is maintained at atmospheric pressure, but considerable pressure is developed in the working chambers 11a and 11b, hence there is a tendency for oil to leak from said chambers past the piston into the supply chamber 13. In order to keep the working chambers 11a and 11b filled with oil at all times, ports 72 and 73 are provided which lead from the recess 22 into said chambers respectively. These ports are furnished with a check-valve 74 and 75 respectively, opening toward the working chamber 11a and 11b.

The operation of the shock absorber will now be explained and in this connection it should be noted that the term "compression stroke" as used herein, when applied to the spring or axle, denotes the whole upward movement of the spring or axle, whether above, below or through normal while the term "expansion stroke" denotes the corresponding downward movement. These terms should not be confused with the compression and expansion produced by the piston which takes place in one working chamber or the other on movement of the piston in either direction.

In Figs. 1, 2, and 3, the shock absorber is shown in normal position, the piston being centrally located in the cylinder. When the vehicle strikes an obstruction the axle 38 is raised with respect to the vehicle body, compressing the vehicle spring 39, lifting the crank arm 35, and causing the piston 20 to move toward the right, as shown in Figs. 2 and 3. As a result of this movement the working chamber 11a is contracted and the working chamber 11b correspondingly expanded, so that the oil which fills the chamber 11a is forced out of said chamber into the chamber 11b. There are two avenues for the escape of oil from the chamber 11a into the chamber 11b. In one case the oil passes through the notch 46 under the wall 58 into the recess 49 and thence through the duct 52 past the valve 54 to the chamber 11b. The other avenue of escape is the duct 62 which is restricted by the valve 64, and the springs 65a, and 65b which control the valve 64 are sufficiently powerful to prevent oil from passing through the duct 62 until considerable pressure has been developed in the chamber 11a.

In addition to the actual escape of oil through the two avenues above defined, there is an opportunity for part of the oil to be temporarily resiliently displaced by compression of the plunger 67 against the spring 70, but it will be understood that this oil is not lost to the working chamber 11a but is restored thereto as soon as the pressure in the chamber drops sufficiently for the spring 70 to expand and force the plunger 67 outward against the strap 71. The spring 70 is very light and offers comparatively little resistance to compression, so that the resilient displacement of oil may take place even on small piston movements producing very little compression in the chamber 11a.

We may now follow the course of the oil from chamber 11a to chamber 11b, upon movement of the piston into chamber 11a. It will be observed that the effective orifice formed between the wall 58 and the notch 46 will at first slightly expand until the wall is centered over the notch and then will gradually close as the outer edge of the wall 58 approaches the outer inclined face of the notch 46. Eventually, the by-pass through the notch 46 will be closed off completely and thereafter further displacement of oil will have to take place through the duct 62. However, the passage of oil by way of notch 46 is throttled not only by the movement of the wall 58 with respect to the notch 46, but also by the valve 54 which is pressed against its seat by the spring 56. The strength of the spring 56 is carefully chosen to yield to predetermined differential pressures developed between chambers 11a and 11b, and the tapered body 54a provides a predetermined control which extends through a considerable travel of the valve 54. This form of valve not only prevents chattering which would be likely to occur if an ordinary ball check valve were used, but it also affords another means of controlling the resistance offered to the movement of the main spring 39, for the taper of the valve body may be varied to provide a predetermined pressure curve in the chamber 11a. It will be observed, therefore, that I have provided in my improved shock absorber, a control depending upon the position of the piston in the cylinder, and another control dependent upon the pressure developed by the piston in the working chamber, and these two controls operate in series.

Before the piston 20 is moved sufficiently to entirely close off the passage through the notch 46 sufficient oil pressure will have been developed in the chamber 11a to overpower the spring 65b, moving the valve 64 toward the left off its seat 63 and permitting oil to pass through the duct 62 into the chamber 11b. The extent to which the valve is moved off its seat is determined by the pressure in the chamber 11a, and the strength of the spring 65b, and because of the tapered body of the valve 64 the effective opening through the duct 62 will be graduated in predetermined proportion to the pressure developed in the chamber 11a.

Assuming that the piston has moved to the end of its stroke in the righthand direction, the vehicle spring 39 now being completely compressed, will begin to expand and move the piston toward the left. This will cause oil to be displaced from the chamber 11b back into chamber 11a, but at first the oil cannot pass by way of the notch 47 in the throttle bar 45 and its only escape will be by way of the duct 62, until the piston has moved far enough to the left for the right hand edge of the wall 59 to begin to open the passage by way of the notch 47. In other words, the piston will have moved back practically to its normal position before any relief can take place through the notch 47. Thereafter, oil will pass by way of notch 47 into the recess 50 and thence by way of duct 53 and spring pressed valve 55 to the chamber 11a.

Continued movement of the piston will cause the oil to flow by way of the throttle bar until the outer edge of the wall 59 approaches the outer inclined face of the notch 47 sufficiently to materially throttle the passage of oil therethrough. When this throttling reaches a certain amount, pressure will be developed sufficient again to operate the valve 64 against the pressure of spring 64a, so that the oil which cannot escape by way of the throttle passage now makes its way through the duct 62 into the chamber 11a.

On small movements of the piston, the valve 64 does not come into play because there is sufficient leakage to take care of the escape of oil caused by the comparatively small compressions developed by such small spring movements. It will be observed, however, that the notch 46 is nearer the center line of the shock absorber than is the notch 47, and consequently when the piston is reciprocated greater pressure will be developed on movements in one direction than on movements in the other. The relative positions of the notches as well as the inclination of their walls may be varied to any desired extent, thus providing further means of controlling the snubbing characteristics of my improved shock absorber.

I have described the action of the piston when the vehicle passes over an obstruction, but it will be understood that the same action takes place, although in the opposite direction, when a vehicle wheel drops into a hole or depression in the road and causes an initial expansion of the spring from normal position. In such case the piston initially moves toward the left, as shown in Figs. 2 and 3, and then moves toward the right on the rebound of the spring.

Figures 8, 10, 11:
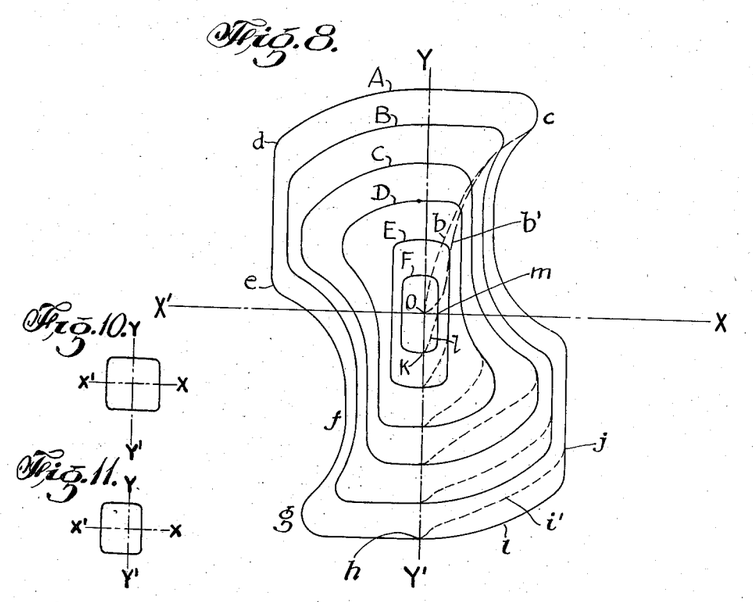
Fig. 8 is a diagram illustrating typical resistance-travel curves obtained with my shock absorber at a certain setting thereof.
Figs. 10 to 12 illustrate various resistance-travel curves obtainable on small spring movements.

A better understanding of the operation of the cushion plunger may be had by referring to the diagram, Fig. 8, which illustrates a series of typical resistance-travel curves which may be obtained with my shock absorber. In this diagram measurements parallel to the axis Y—Y' represent movements of the vehicle axis with respect to the body, or vice versa. The normal position of the piston is indicated at O. Movements of the piston toward the right are read upward on the diagram and movements toward the left downward. Variations of the pressure in the chamber 11a are indicated by the lines to the right of the axis Y—Y' and pressures in the chamber 11b to the left of said axis. Thus, on an initial compression stroke of the vehicle spring, the line O—b—c indicates the variation of pressure in the chamber 11a with corresponding displacement of the piston. A very smooth curve is provided, because the spring control overlaps the throttle control to such an extent as to smooth out the curve. Were it not for the cushion plunger 67, the pressure curve would build up very rapidly at the start and would follow substantially the line O—b'—c.

In the diagram I have shown a number of curves in full lines indicated by the reference letters, A, B, C, D, E, and F, each of these is a typical resistance-travel curve obtained by sustained oscillation of the spring through a predetermined range. Thus, the curve A represents a cycle of pressures obtained by oscillating the spring through a maximum range. After the pressure has risen to a maximum in the chamber 11a, the piston starts to move in the opposite direction and the pressure in chamber 11a drops rapidly to zero, while pressure will be rapidly built up in the chamber 11b reaching a maximum at a point d. This pressure will be maintained at a fairly constant value even past the point at which the notch 47 begins to open, because the velocity of the piston is a factor that must be considered. At the point e, the escape through the notch 47 will be sufficient to cause a rapid drop of pressure in the chamber 11b, which will continue even after the piston has moved well past the normal position indicated by the axis X—X'. At the point f the throttling of the notch 47 by the wall 59 will be sufficient to build up pressure again in the chamber 11b. Eventually the pressure in the chamber will rise sufficiently to open the valve 64 against the spring 65a, and the pressure will continue to rise until it reaches a maximum at the point g. Thereafter the piston will start on its return stroke, toward the right, and the pressure will drop to zero at h.

On this return stroke of the piston the pressure curve developed in the fourth quadrant Y'—O—X would be substantially identical with that developed in the second quadrant Y—O—X', were it not for the cushion plunger 67. The full line h—i—j represents the pressure travel curve that would be formed if no cushion were present, and the broken line h—i'—j represents the modification of this curve caused by the cushion plunger. It will be observed, however, that the pressure curve in the first quadrant X—O—Y, after the initial stroke, will not be materially affected by the plunger 67, because there will be sufficient pressure throughout to keep the cushion plunger fully depressed; hence the curve in the first quadrant will be substantially identical to that of the third quadrant X'—O—Y'.

The shape of the resistance-travel curves will depend upon the amplitude of movement of the spring, but even the smallest curve illustrated will show considerable compression in each quadrant of the cycle. As illustrated, the curve F is substantially a rectangle with somewhat lower pressure developed on the compression stroke than on the expansion stroke of the spring, because the notch 46 is slightly nearer the center of the cylinder than is notch 47. However, the curve F is modified in the fourth quadrant by the cushion plunger, this modification being illustrated by the broken line k—l—m.

The curve E is very similar to the curve F, but a marked change in the form of the pressure-travel curve is to be noted as the amplitude of piston movement is increased to form the curves D, C, B, and A. In the case of curves D, and C, the notch 46 is not entirely cut off by movement of the piston 20 toward the right, so that the valve 64 does not play as prominent a part in the operation of the shock absorber, but on movements of the piston toward normal considerable pressure is developed by reason of the fact that the wall 59 has completely closed off the notch 47 at the beginning of the stroke and consequently the only escape for the oil is by way of the duct 62. Thus, much greater pressures are developed on movements of the piston toward normal, than on movement of the piston away from normal, except in a case of small movements, and the pressures reach a higher degree in the second and third quadrants than in the first and fourth because the notch 47 is further removed from the center of the cylinder than is notch 46.

The curves A and B illustrate a still further variation introduced when the amplitude of piston movement is increased to such an extent as to almost or entirely close off the notch 46. The oil must then force its way through the duct 62, and consequently a considerable pressure is built up forming the bulges c and g respectively, in the first and third quadrants of the diagram. It will be observed that with the throttles as illustrated, a straight line pressure is provided by movements of the spring toward normal in the case of curves A and B and also in the case of curves E and F. It must be borne in mind that the diagram shows resistance-travel curves produced by sustained oscillations of the spring and that in actual practice the curves will spiral down to zero as the oscillation of the spring dies down.

The cushion plunger 67 plays an important part in taking care of sudden jolts produced when the vehicle wheels strike an abrupt obstruction at high speed. It is particularly valuable in taking care of jolts produced when the wheel drops into a hole, and then is thrown suddenly upward as it strikes the far wall of the hole. Thus assuming that the piston has dropped to the position h in the diagram and then encounters the far wall of the hole, if no cushion were provided the pressure would mount suddenly in the chamber 11a imparting a severe jolt to the vehicle frame. With the cushion plunger present, however, the shock is eased off and in the curve A the pressure follows the curve h—i'—j. Similarly, the other curves are modified as shown by broken lines in the diagram.

The cushion plunger 67 may be placed at each end of the piston. Thus in Fig. 2 I show in broken lines a cushion plunger at the left hand side of the piston. However, the cushion plunger is preferably provided only at that end which is under pressure during the compression stroke of the spring. It is on movements in this direction that highest pressure may develop. The vehicle body moves up and down only at its natural periodicity and the axle moves downward under limited spring pressure with a harmonic motion due to the natural period of oscillation of the spring in conjunction with the weight of the wheel and axle, but the upward movement of the spring may take place at a much higher rate depending upon the shape of the obstacle encountered and the speed of travel of the vehicle. In other words, there are known maximum fluid pressures to contend with insofar as body movements are concerned, but unknown and indefinite ones resulting from the upward axle movement, and hence by placing the cushion plunger in the right hand end of the piston, as shown in the drawings, abrupt variations of pressure on the compression stroke of the spring are taken care of.

Obviously, the cushion plunger may be placed in the cylinder wall instead of the piston, if so desired.

Such a construction is shown in Fig. 2a wherein parts corresponding in function to those in Fig. 2 are given like reference numerals with a prime suffix. Thus a thimble 69' is threaded into the end cap 12' of the cylinder 11'. In this thimble is fitted a cushion plunger 67' which is backed by a compression spring 70'. A strap 71' serves as a stop for the cushion plunger 67' and a pipe 80 connects the thimble from a point back of the cushion plunger, to the interior of the cylinder 11'.

It will be clear from the foregoing description that I have devised a shock absorber in which retarding resistance is provided in each quadrant of a pressure cycle, and in which the pressure curve in each quadrant may be separately controlled. The oil is displaced directly from one working chamber into another, and its escape is constricted by position-controlled throttle means and pressure-controlled throttle means operating in series, together with an auxiliary pressure-controlled throttle means which operates on piston movements of considerable amplitude. The position-controlled throttling means may be varied by varying the location, size and inclination of the notches in the throttle bar, the pressure-controlled throttling means may be varied by changing the shape of the valve bodies 54a and 55a, respectively, and of the springs 56 and 57 respectively, while the high pressure throttle control may be correspondingly adjusted by varying the taper or shape of the valve 64 and the strength of the springs 65a and 65b. The resistance-travel curve may be further modified by varying the diameter of the cushion plunger 67 and the strength of the spring 70.

Figures 9, 12:
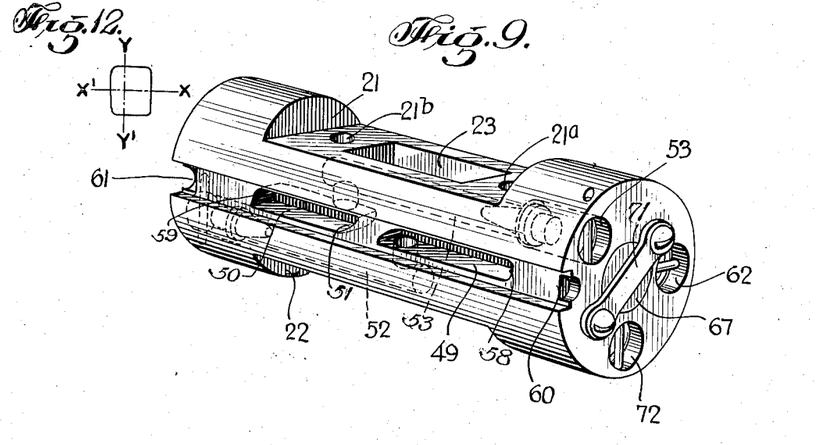
Fig. 9 is a view in perspective of the piston.

In my copending application above referred to, I show a number of resistance-travel curves produced by varying the shape of the throttle bar, but all of said variations relate to the larger spring movements and show little, if any, resistance to the lesser spring movements. With the shock absorber disclosed in the present application all of the resistance-travel curves shown in said copending application may be reproduced and at the same time a substantial amount of resistance to smaller spring movements may be provided by varying the relative position of the notches 46 and 47. A few of such resistance travel variations on small spring movements are shown in Figs. 10 to 12 inclusive. In these figures a greater pressure is developed than in the corresponding curve F of Fig. 8. In Fig. 10 the pressure is as great on one side of the axis Y—Y' as on the other; in Fig. 11 there is a greater pressure on the left hand side than on the right hand side of the axis, while in Fig. 12 a greater pressure is developed on the right hand side of the axis.

It will be understood, of course, that these curves do not show the effect of a cushion plunger which, if present, would modify each curve in the same manner as described above in connection with Fig. 8.

While I have described a preferred embodiment of my invention, the invention is not limited to this particular structure, but, I consider myself at liberty to make such changes and variations in form, construction and arrangements of parts as may be found desirable and as fall within the spirit and scope of my invention as pointed out in the following claims.

I claim:

1. In a hydraulic shock absorber, a liquid container, a member movable therein and cooperating therewith to form a pair of opposed working chambers and two independent passages connecting said chambers, a spring pressed valve in one passage and opening toward one chamber and a spring pressed valve in the other passage and opening toward the other chamber, and means for constricting said passages in predetermined relation to successive instantaneous positions of said member.

2. In a hydraulic shock absorber, a liquid container, a member movable therein and cooperating therewith to form a pair of opposed working chambers and two independent passages connecting said chambers, a spring pressed valve in one passage and opening toward one chamber and a spring pressed valve in the other passage and opening toward the other chamber, and means for constricting each passage individually in predetermined relation to successive instantaneous positions of said member.

3. In a hydraulic shock absorber, a liquid container, a member movable therein and cooperating therewith to form a pair of opposed working chambers and an intermediate supply chamber and two passages connecting said working chambers, a spring pressed valve in one passage and opening toward one of the chambers and a spring pressed valve in the other passage and opening toward the other chamber, means for constricting said passages in predetermined relation to successive instantaneous positions of said member, and a check valve opening from the supply chamber into each of the working chambers.

4. In a hydraulic shock absorber, a cylinder, a piston therein cooperating therewith to form a pair of working chambers, means for reciprocating the piston to alternately expand and contract each working chamber, and means permitting controlled interchange of liquid between the two chambers, said means comprising a pair of independent passages with a spring pressed valve in one passage and opening toward one chamber and a spring pressed valve in the other passage and opening toward the other chamber and means for constricting each passage in predetermined relation to successive instantaneous positions of the piston.

5. The combination with a hydraulic shock absorber comprising a cylinder and a piston reciprocable therein and dividing the same into a pair of working chambers, of means permitting controlled interchange of liquid between said chambers, said means comprising two main passages and an auxiliary passage, a spring pressed valve in one of the main passages and opening toward one chamber and a spring pressed valve in the other of the main passages and opening toward the other chamber, means for constricting each main passage in predetermined relation to successive instantaneous positions of the piston, and a valve in the auxiliary passage adapted to open whenever the differential pressure in the working chambers exceeds a predetermined value.

6. In a hydraulic shock absorber, a cylinder, a piston reciprocable therein and cooperating therewith to form a pair of working chambers and a pair of passages connecting said chambers, one of the chambers having a liquid-tight resilient wall, a spring pressed valve in one of the passages and opening toward one chamber and a spring pressed valve in the other passage and opening toward the other chamber, means for constricting each passage in predetermined relation to successive instantaneous positions of the piston, the piston being formed with an auxiliary passage connecting the chambers, and a balanced valve in the auxiliary passage adapted to open when the differential pressures in the chambers exceeds a predetermined value.

7. In a hydraulic shock absorber, a cylinder, a piston reciprocable therein and cooperating therewith to form a pair of working chambers, a pair of passages connecting said chambers, a spring pressed valve in one of the passages and opening toward one chamber and a spring pressed valve in the other passage and opening toward the other chamber, and means for constricting each passage in predetermined relation to succesive instantaneous positions of the piston, each of the valves having means adapted to provide a graduated opening of the valve.

8. In a hydraulic shock absorber, a cylinder, a piston reciprocable therein and cooperating therewith to form a pair of working chambers, a pair of passages connecting said chambers, a spring pressed valve in one of the passages and opening toward one chamber and a spring pressed valve in the other passage and opening toward the other chamber, means for constricting each passage in predetermined relation to successive instantaneous positions of the piston, the piston being formed with an auxiliary passage connecting the chambers, and a balanced valve in the auxiliary passage adapted to open when the differential pressure in the chambers exceeds a predetermined value, each of the valves embodying means adapted to provide a graduated opening of the valve.

9. In a hydraulic shock absorber, a cylinder, a piston reciprocable therein and cooperating therewith to form a pair of working chambers, a pair of passages connecting said chambers, a spring pressed valve in one of the passages and opening toward one chamber and a spring pressed valve in the other passage and opening toward the other chamber, means for constricting each passage in predetermined relation to successive instantaneous positions of the piston, the piston being formed with an auxiliary passage connecting the chambers, and a balanced valve in the auxiliary passage adapted to open when the differential pressure in the chambers exceeds a predetermined value, each of the valves having a tapered body portion adapted to provide a graduated opening thereof, the piston being also formed with a recess in one end thereof, and a spring pressed plunger in said recess.

10. In a hydraulic shock absorber, a cylinder, a piston reciprocable therein and dividing the cylinder into a pair of working chambers, the piston being also formed with a pair of recesses in the cylindrical wall thereof, the cylinder being provided with V-shaped notches adapted respectively to provide communication between each recess and one of said chambers, the piston being also formed with a passage leading from each recess to the other chamber, and a spring pressed valve in each of said passages and opening toward the chamber to which the passage leads.

11. In a hydraulic shock absorber, a cylinder, a piston reciprocable therein and dividing the cylinder into a pair of working chambers, the piston being formed with a longitudinally disposed groove, a throttle bar secured to the cylinder and fitting into the groove, said groove having a pair of recesses therein, each recess being separated from the working chamber adjacent thereto by an end wall and being connected to the opposite working chamber by a passage formed in the piston, the throttle bar being formed with notches respectively by-passing said end walls when the piston is in normal position, and a spring pressed valve in each passage and opening toward the chamber with which the passage communicates, each valve being formed with a tapered body to provide graduated control of the opening of the passage.

12. In a hydraulic shock absorber, a cylinder, a piston reciprocable therein and dividing the cylinder into a pair of working chambers, the piston being formed with a longitudinally disposed groove, a throttle bar secured to the cylinder and fitting into the groove, said groove having a pair of recesses therein, each recess being separated from the working chamber adjacent thereto by an end wall and being connected to the opposite working chamber by a passage formed in the piston, the throttle bar being formed with notches respectively by-passing said end walls when the piston is in normal position, a spring pressed valve in each passage and opening toward the chamber with which the passage communicates, each valve being formed with a tapered body to provide graduated control of the opening of the passage, the cylinder being also provided with a liquid supply chamber, and a pair of check valves opening respectively from the supply chamber into each of said working chambers.

13. In a hydraulic shock absorber, a cylinder, a piston reciprocable therein and dividing the cylinder into a pair of working chambers, the piston being formed with a longitudinally disposed groove, a throttle bar secured to the cylinder and fitting into the groove, said groove having a pair of recesses therein, each recess being separated from the working chamber adjacent thereto by an end wall and being connected to the opposite working chamber by a passage formed in the piston, the throttle bar being formed with notches respectively by-passing said end walls when the piston is in normal position, a spring pressed valve in each passage opening toward the chamber with which the passage communicates, each valve being formed with a tapered body to provide graduated control of the opening of the passage, the piston being also provided with a duct extending therethrough and connecting said chambers, and a spring pressed valve in said duct and adapted to open when the differential pressure in the working chambers exceeds a predetermined value.

14. In a hydraulic shock absorber, a liquid container, a member dividing the container into a pair of working chambers, means for relatively moving the members to and fro to develop a cycle of pressures in said chambers, and means providing separate control of the pressures in each quadrant of said cycle on larger movements of said member and independent control of the pressures on smaller movements of said member.

15. In a hydraulic shock absorber, a liquid container, a piston dividing the container into a pair of working chambers, means for reciprocating the piston to cause displacement of liquid from one chamber into the other and vice versa, and means for variably resisting such displacement, the latter means comprising separate control of the amount of such resistance on small movements of the plunger as distinguished from larger movements thereof and on movements of the plunger toward normal position as against movements of the plunger away from normal position, said latter means also including separate control of the amount of such resistance on larger movements of the piston into one chamber as distinguished from the larger movements of the piston into the other chamber.

16. In a hydraulic shock absorber, a fluid container, a member movable therein and cooperating therewith to form a pair of opposed working chambers and a pair of independent passages connecting said chambers, a spring-pressed valve in one passage opening toward one chamber, and a spring-pressed valve in the other passage opening toward the other chamber, each passage being formed with a variable metering port.

17. In a hydraulic shock absorber, a fluid container, a piston movable therein and cooperating therewith to form a pair of opposed working chambers, and a one-way fluid connection leading from each chamber directly into the other, each connection including a spring-pressed valve and a variable metering port in series therewith.

18. A shock absorber comprising a working chamber adapted to contain a fluid; a piston movably arranged therein; a transfer passage leading from one end of said chamber; a check valve in said passage; means operatively connected with said piston for controlling the flow of fluid through said passage; a transfer passage leading from the other end of said chamber and also provided with a check valve; and means for also controlling the flow of fluid through said last named passage.

19. A shock absorber comprising a working chamber adapted to contain a fluid; a piston movably arranged therein; a transfer passage leading from one end of said chamber; a check valve in said passage; means operatively connected with said piston for controlling the flow of fluid through said passage in a definite but irregular manner; a transfer passage leading from the other end of said chamber and also provided with a check valve; and means for also controlling the flow of fluid through said last named passage.

20. A shock absorber comprising a chamber adapted to contain a fluid; a piston movably arranged therein; a transfer passage connected at its opposite ends to said chamber at points adjacent to the opposite ends of said piston; means operatively connected with said piston for controlling the flow of fluid through said passage in one direction only; a transfer passage leading from the other end of said chamber and also provided with a check valve; and means for also controlling the flow of fluid through said last named passage.

21. A shock absorber comprising a chamber adapted to contain a fluid; a piston movably arranged therein; a pair of transfer passages connected at opposite ends to the opposite ends of said chamber; a check valve in each of said passages to ensure opposite fluid flows therethrough; and a graduating valve operatively connected with said piston and adapted to control the flow of fluid through one of said passages.

JOHN M. NALLE.